United States Patent
Mirsky et al.

(10) Patent No.: US 12,470,470 B2
(45) Date of Patent: Nov. 11, 2025

(54) LOAD BALANCING AND OAM IN SERVICE FUNCTION CHAINING USING MULTIPROTOCOL LABEL SWITCHING

(71) Applicant: ZTE Corporation, Guangdong (CN)

(72) Inventors: Gregory Mirsky, Pleasanton, CA (US); Yao Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 413 days.

(21) Appl. No.: 18/164,301

(22) Filed: Feb. 3, 2023

(65) Prior Publication Data

US 2023/0188449 A1 Jun. 15, 2023

Related U.S. Application Data

(63) Continuation of application No. PCT/CN2020/116709, filed on Sep. 22, 2020.

(51) Int. Cl.
*H04L 43/106* (2022.01)
*H04L 47/125* (2022.01)

(52) U.S. Cl.
CPC .......... *H04L 43/106* (2013.01); *H04L 47/125* (2013.01)

(58) Field of Classification Search
CPC ..... H04L 43/106; H04L 47/125; H04L 12/12; H04L 45/0377; H04L 45/50
See application file for complete search history.

(56) References Cited

U.S. PATENT DOCUMENTS

| | | |
|---|---|---|
| 8,804,736 B1 | 8/2014 | Drake et al. |
| 9,300,579 B2 | 3/2016 | Frost et al. |
| 10,263,887 B2 * | 4/2019 | Patil ............... H04L 45/566 |
| 2012/0163190 A1 | 6/2012 | Jocha et al. |
| 2017/0366461 A1 * | 12/2017 | Wu ............... H04L 45/50 |
| 2018/0091420 A1 * | 3/2018 | Drake ............... H04L 45/033 |
| 2018/0295053 A1 | 10/2018 | Leung et al. |

(Continued)

FOREIGN PATENT DOCUMENTS

| | | |
|---|---|---|
| CN | 102577260 A | 7/2012 |
| CN | 111213345 A | 5/2020 |
| WO | 2020/181636 A1 | 9/2020 |

OTHER PUBLICATIONS

Farrel, A. et al., "An MPLS-Based Forwarding Plane for Service Function Chaining," MPLS Working Group, Internet-Draft, draft-ietf-mpls-sfc-05, Aug. 16, 2019 (57 pages).

(Continued)

*Primary Examiner* — Kibrom T Hailu
(74) *Attorney, Agent, or Firm* — Perkins Coie LLP

(57) ABSTRACT

Disclosed are devices, systems and methods for load balancing and operation, administration and maintenance (OAM) in service function chaining using the multiprotocol label switching (MPLS) forwarding plane. In some implementations, a packet processing method includes processing a network packet comprising a plurality of labels based on presence of an indicator label in the plurality of labels such that in case that the indicator label is present in the network packet, the indicator label is used to determine a first destination of a payload of the network packet, and in case that the indicator label is not present in the network packet, the payload is passed to a second destination selected based on a service function indicator in the plurality of labels.

20 Claims, 11 Drawing Sheets

(56) References Cited

U.S. PATENT DOCUMENTS

2020/0153716 A1* 5/2020 Nainar ................. H04L 43/062
2020/0358698 A1* 11/2020 Song ...................... H04L 45/50

OTHER PUBLICATIONS

Office Action for Chinese Patent Application No. 202080103020.5, mailed Jul. 9, 2024 (18 pages).
Farrel, A. et al. "An MPLS-Based Forwarding Plane for Service Function Chaining," 1-25 Internet Engineering Task Force (IETF), Request for Comments: 8595, Jun. 30, 2019.
International Search Report and Written Opinion for International Application No. PCT/CN2020/116709, mailed on Jun. 25, 2021 (9 pages).
Extended European Search Report for European Patent Application No. 20954343.8, mailed Sep. 19, 2023 (11 pages).
Farrel, A. et al., "An MPLS-Based Forwarding Plane for Service Function Chaining draft-ietf-mpls-sfc-05," MPLS Working Group, Feb. 12, 2019 (29 pages).
CNIPA, Notification to Complete Formalities of Registration for Chinese Application No. 202080103020.5, mailed on Mar. 17, 2025, 4 pages with unofficial English translation.

* cited by examiner

LOAD BALANCING AND OAM IN SERVICE FUNCTION CHAINING USING MULTIPROTOCOL LABEL SWITCHING

CROSS REFERENCE TO RELATED APPLICATIONS

This patent document is a continuation of and claims benefit of priority to International Patent Application No. PCT/CN2020/116709, filed on Sep. 22, 2020. The entire content of the before-mentioned patent application is incorporated by reference as part of the disclosure of this application.

TECHNICAL FIELD

This patent document relates to service function chaining in data communications networks.

BACKGROUND

The delivery of end-to-end services often requires various service functions, spanning from traditional firewalls and IP Network Address Translators (NATs) to application-specific functions. Packets are often steered to follow a certain order through a set of service functions before reaching their destination. The definition and instantiation of an ordered set of service functions and subsequent steering of traffic through the service functions can be called Service Function Chaining (SFC).

SUMMARY

This patent document describes, among other things, load balancing and operation, administration and maintenance (OAM) in service function chaining using the multiprotocol label switching (MPLS) forwarding plane.

In some embodiments of the disclosed technology, a packet processing method includes processing a network packet comprising a plurality of labels based on presence of an indicator label in the plurality of labels such that in case that the indicator label is present in the network packet, the indicator label is used to determine a first destination of a payload of the network packet, and in case that the indicator label is not present in the network packet, the payload is passed to a second destination selected based on a service function indicator in the plurality of labels.

In some embodiments of the disclosed technology, a data communication method includes receiving, a data packet including a payload and a plurality of labels that includes a service path identifier label and a service function label, determining whether the plurality of labels includes at least one of a first label indicating a channel for exchanging a test packet or a second label including a load balancing information, passing the data packet to a service function selected based on at least one of the service path identifier label or the service index label, and passing, upon determination that the plurality of associated labels includes at least one of the first and second labels, the data packet to a destination determined based on the at least one of the first and second labels.

In yet another exemplary aspect, the above-described methods and/or the methods described in this patent document are embodied in the form of processor-executable code and stored in a computer-readable program medium. The computer readable program is stored on a non-transitory computer readable media, the computer readable program including code that when executed by a processor, causes the processor to implement the methods described in this patent document.

In yet another exemplary embodiment, a device is disclosed that is configured or operable to perform the above-described methods and/or the methods described in this patent document.

The above and other aspects and their implementations are described in greater detail in the drawings, the descriptions, and the claims.

DETAILED DESCRIPTION

From the time of initial deployment of the internet, the amount of data being handled worldwide by internet infrastructure has seen explosive growth. As such, there have been numerous improvements to the initial internet framework to allow for efficient transportation of data over wide geographic networks such as across states, countries or continents. One example internet technology is called "service function chaining," which is used to control packet routing through the applicable network functions. A network is built out of devices that process packets and links that interconnect these devices. Historically, only physical devices were used and adding new functions, e.g., a firewall, NAT or routing, required either a new box or upgrade of the existing box. An alternative solution arrived with the paradigm of virtualization of networks (Network Function Virtualization, NFV). Boxes have been disaggregated into functional components that are implemented as software applications that run on general servers (sometimes with hardware assist to improve performance). Service function chaining (SFC) provides a method to navigate a packet through these virtual network functions to realize the processing equivalent to processing in a sequence of physical network devices.

Figure 1:
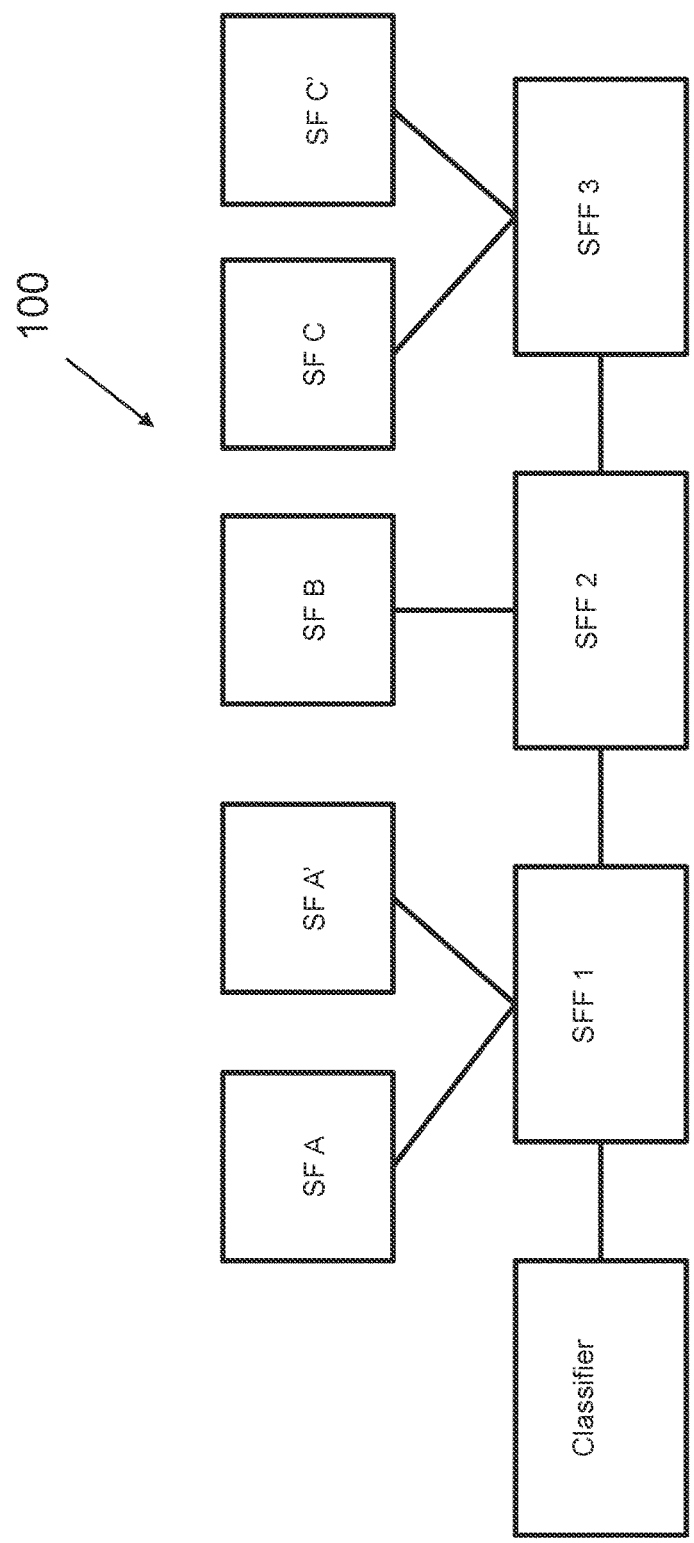
FIG. 1 shows an example of service function chaining (SFC) reference model.

FIG. 1 shows an example of service function chaining (SFC) reference model.

The service function chaining relates to the definition and instantiation of an ordered set of network functions and subsequent steering a data flow through them. A service function chain defines an ordered set of abstract service functions and ordering constraints that must be applied to packets, frames, and/or flows selected as a result of classification. Such a service function chain includes a classifier, service function forwarder (SFF) and a service function (SF). As shown in FIG. 1, a service function chain can use service functions of different types (e.g., SFs of type A, B, and C). In some implementations, more than one instance of a service function can be connected to a service function forwarder. For example, there are two instances of service function A (SF A, SF A') and two instances of service function C (SF C, SF C') connected to a first service function forwarder (SFF 1) and a third service function forwarder (SFF 3), respectively.

In some implementations, the service function chaining (SFC) can be realized using a network service header (NSH). The network service header (NSH) can be imposed on packets or frames to realize service function paths (SFPs). The network service header also provides a mechanism for metadata exchange along the instantiated service paths. The network service header can be the service function chaining encapsulation required to support the service function chaining architecture.

In this patent document the term "network service" is used to indicate an offering provided by an operator that is delivered using one or more service functions. The term "service" is used to denote a "network service" in the context of this patent document.

In some implementations, the network service header includes a base header, one or more service path header, and one or more context headers. The base header may include next protocol field to identify the type of the payload that immediately follows the network service header. The service path identifier (SPI) may be used to uniquely identify the service function path (SFP).

A set of operation, administration, and maintenance (OAM) protocols provides a fault management and performance monitoring as components of FCAPS (fault, configuration, accounting, performance, security) model of the network management. Such OAM protocols may be classified by their use of specially constructed packets. Active OAM methods rely on detecting defects and/or measuring network performance using network test packets generated and injected. A comprehensive set of OAM protocols is essential for the operation of a network whether it is an underlay network or an overlay network.

The service function chaining (SFC) can be achieved in a multiprotocol label switching (MPLS) network by means of a logical representation of the network service header (NSH) in an MPLS label stack. That is, even if the NSH is not used, the fields of the NSH are mapped to fields in the MPLS label stack.

When an MPLS label stack is used to carry a logical NSH, a basic unit of representation is used. The basic unit may replicate NSH semantics and realize the service function chaining (SFC) over the MPLS forwarding plane (SFC-MPLS).

The disclosed technology can be used in some implementations to provide mechanisms to support OAM protocols at the service function path (SFP) layer while using MPLS data planes between different service function forwarders (SFFs).

Figure 2A:
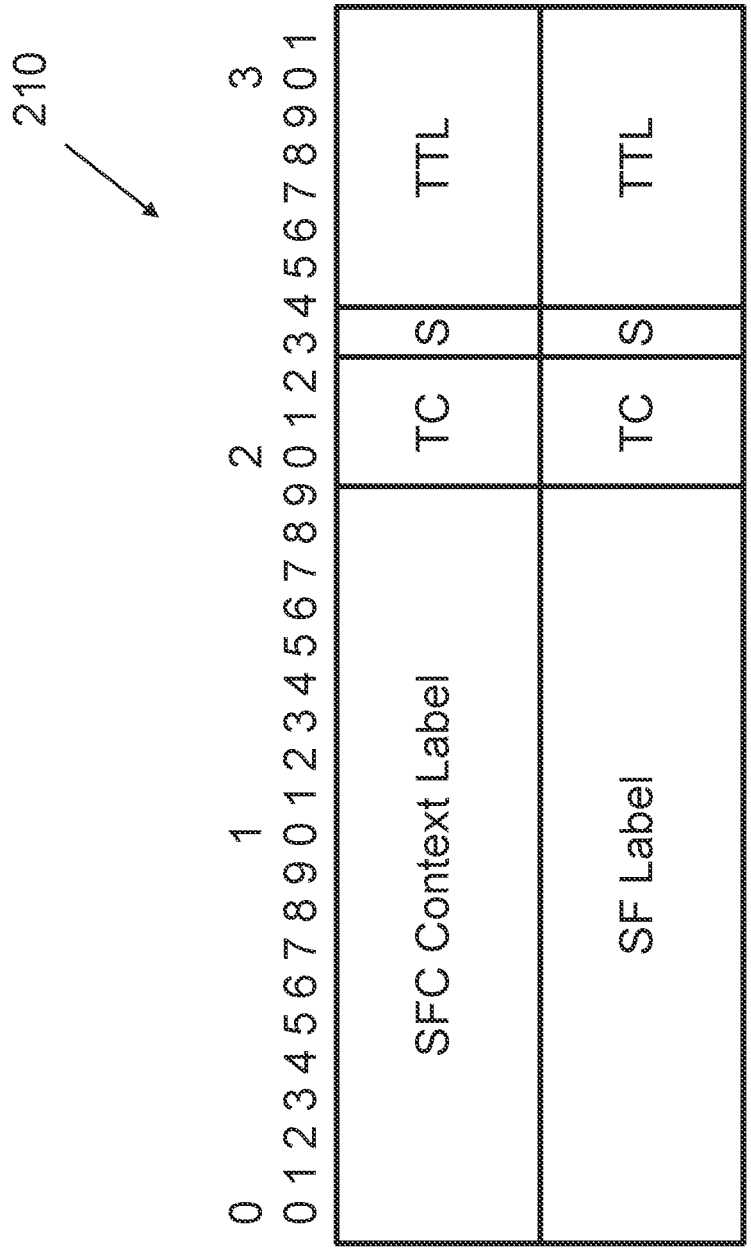
FIG. 2A shows an example of a basic unit of multiprotocol label switching (MPLS) label stack for SFC.
Figure 2B:
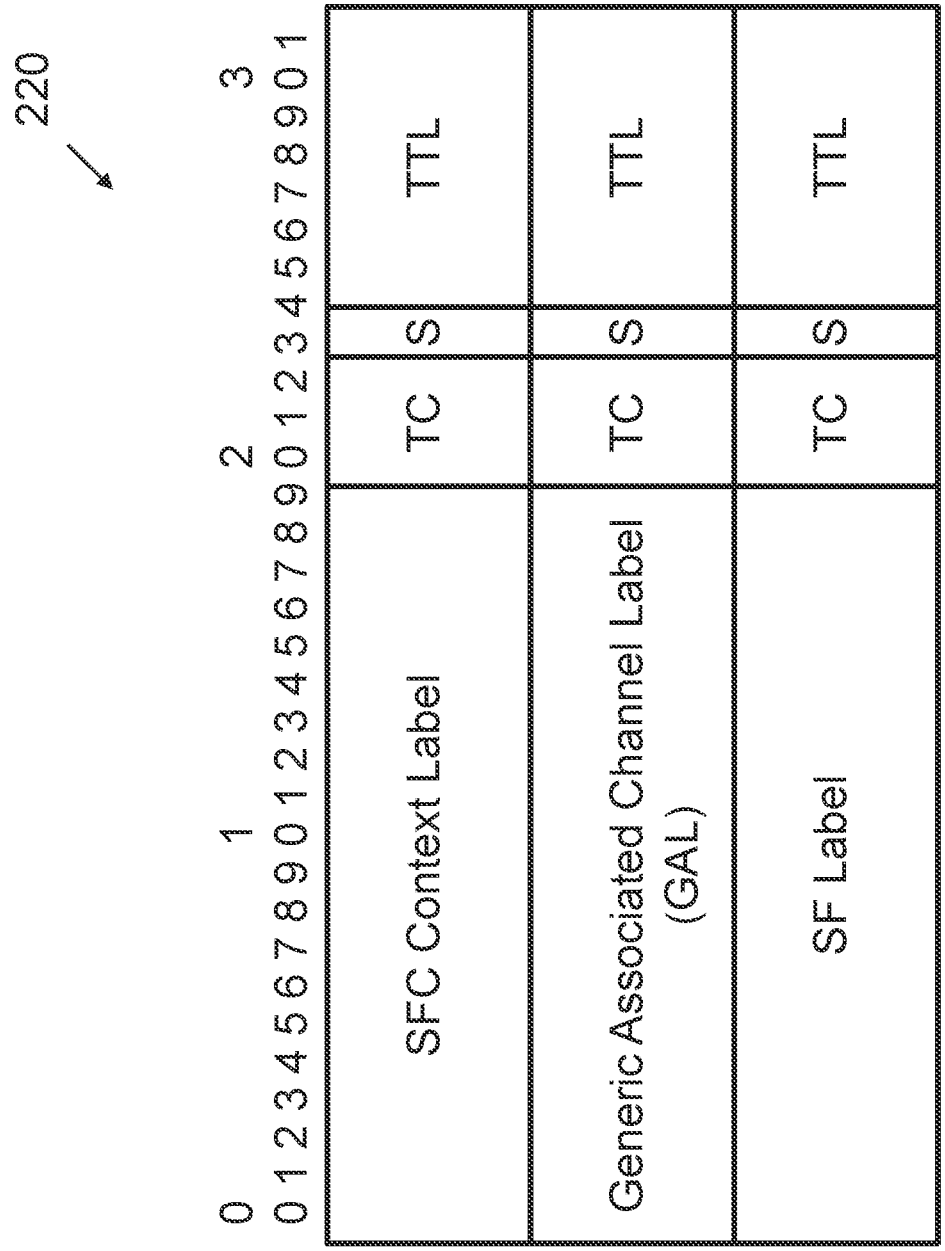
FIG. 2B shows another example of the basic unit of multiprotocol label switching (MPLS) label stack for SFC.
Figure 2C:
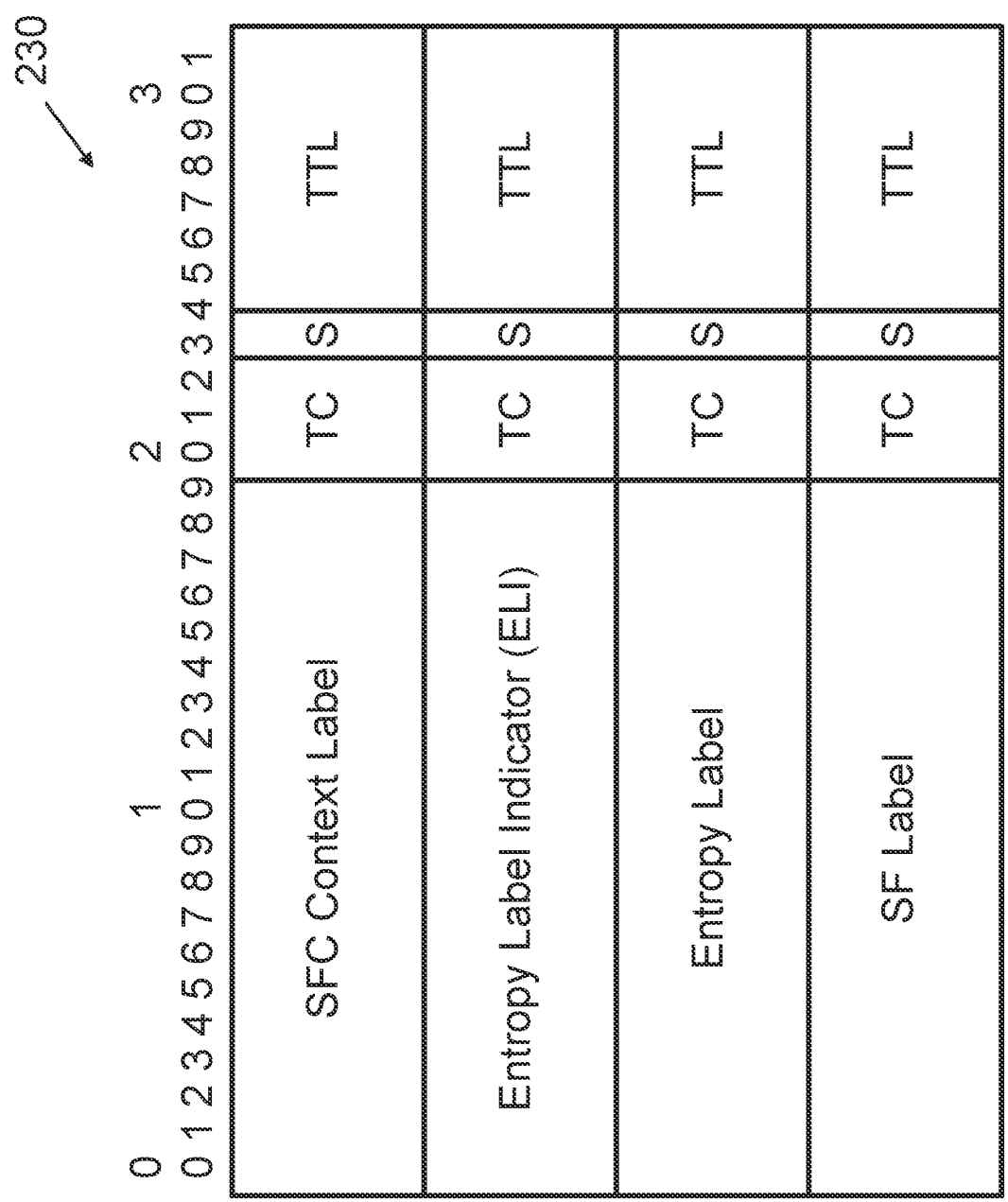
FIG. 2C shows another example of the basic unit of multiprotocol label switching (MPLS) label stack for SFC.

FIG. 2A shows an example of a basic unit of multiprotocol label switching (MPLS) label stack for service function chaining (SFC). FIG. 2B shows another example of the basic unit of MPLS label stack for SFC. FIG. 2C shows another example of the basic unit of MPLS label stack for SFC.

As illustrated in FIGS. 2A-2C, a basic unit may include a label field, a TC bits, S bit, and a TTL field. The label field of a basic unit may include a service function chaining (SFC) context label and a service function (SF) label, and the interpretation of SFC context labels and SF labels depends on whether the transport labels are swapped or stacked. If the swapping method is used between SFFs, a single basic unit can realize an SFC.

As shown in FIG. 2A, a basic unit may include an SFC context label, an SF label, a traffic class (TC) field, a bottom-of-stack (S) bit, and a time-to-live (TTL) field. In an example, the TTL field can be used to indicate the maximum service function forwarder (SFF) hops for a service function path (SFP). The TTL field can also be used for service-plane loop detection. The TTL in the SF label stack entry may be set according to its use for MPLS label swapping or MPLS label stacking. In some implementations, when a router forwards a packet, it reduces the TTL by at least one. If a router holds a packet for more than one second, it may decrement the TTL by one for each second. This way, the TTL may be used as a time count.

The TC field may be used to indicate quality of service (QoS) priority and explicit congestion notification. The S bit may be set according to its position in the label stack. For example, the S bit can be set to one for the last entry in the label stack (i.e., for the bottom of the stack), and zero for all other label stack entries.

In some implementations, a basic unit may include a generic associated channel label (GAL) arranged between the service function chaining (SFC) context label and the service function (SF) label. In one example, GAL has a reserved MPLS label value that can be used to identify the presence of an associated channel header, and a generic associated channel (G-Ach) can be identified by the value of the S field being set to "1."

In some implementations, a basic unit may include an entropy label indicator (ELI) and an entropy label (EL) arranged between the service function chaining (SFC) context label and the service function (SF) label. The ELI is used to indicate the presence of EL, and, in some implementations, the EL can be used in MPLS to improve load balancing by providing entropy. For example, a router computes a hash based on several fields from a given packet and places the result in an entropy label, which can be used as part of the hash keys.

Figure 3:
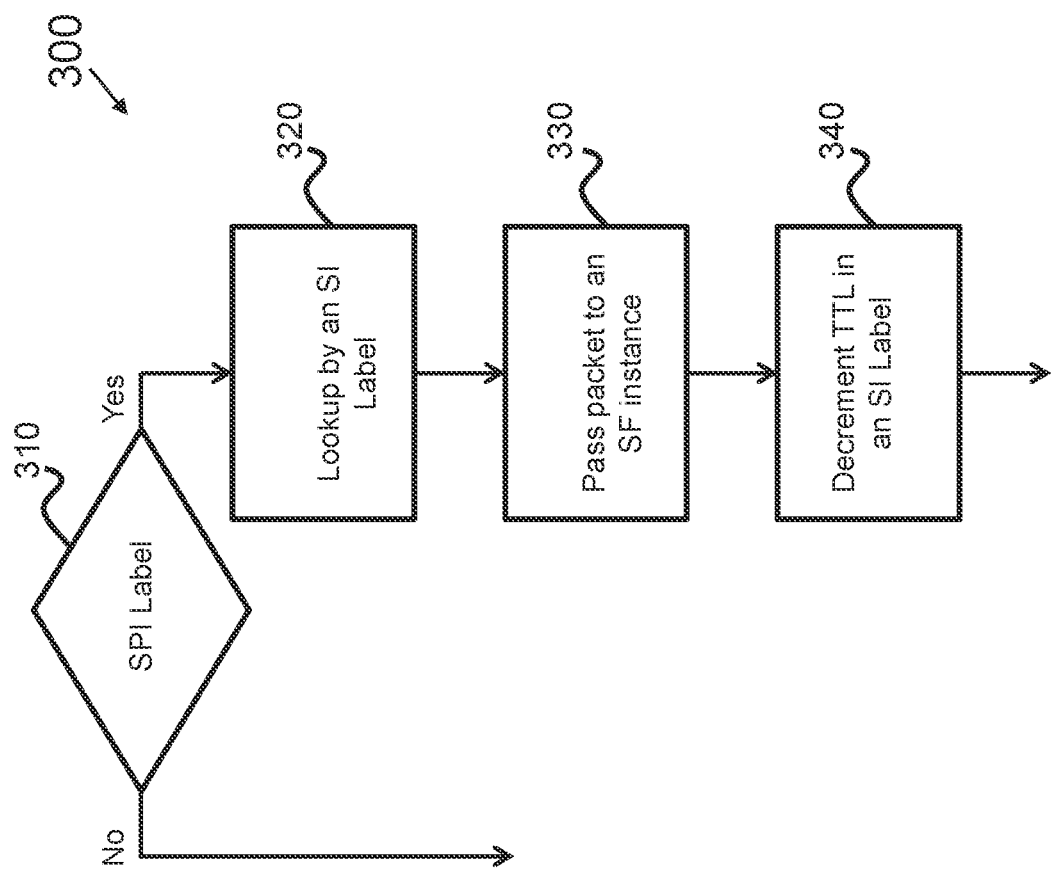
FIG. 3 shows an example flowchart of operations for processing a basic unit in a swapping method.

FIG. 3 shows an example flowchart 300 of operations for processing a basic unit in a swapping method.

In an example scenario where transport labels are swapped, the SFC context label field contains a service path identifier (SPI) label, and the service function (SF) label field of the basic unit contains a service index (SI) label. In another example scenario where the label stacking method is used to transport a packet between service function forwarders (SFFs), a basic unit for each SFF is inserted in the label stack. In some implementations, the value of the TTL field of SF Label element is not analyzed but the value of the SF Label itself is decremented.

In some implementations, the generic associated label (GAL) may be used to identify a generic associated channel (G-ACh) that can be used to carry control and management information, including OAM test packets.

The entropy label indicator (ELI) and the entropy label may be used to improve load balancing in MPLS networks, and may also be used for a segment route tunnel in a network with the MPLS data plane.

In some implementations, as shown in FIG. 3, the operations for processing a basic unit in a swapping method may include, at operation 310, determining whether SPI label is present in a basic unit label stack associated with a packet, at operation 320, upon determination that SPI label is present, performing a look-up operation based on an SI label, at operation 330, passing the packet to an SF instance, and at operation 340, decrementing TTL value in an SI label.

Figure 4:
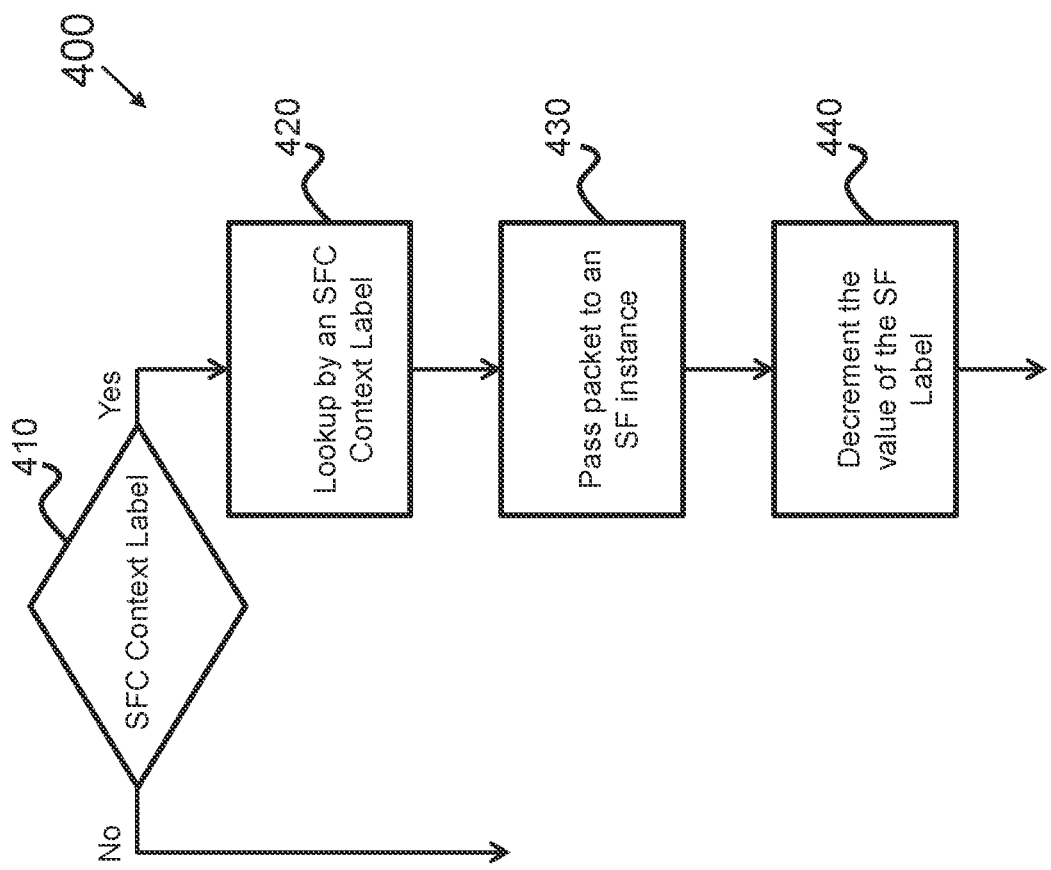
FIG. 4 shows an example flowchart of operations for processing a basic unit in a stacking method.

FIG. 4 shows an example flowchart 400 of operations for processing a basic unit in a stacking method.

In some implementations, the operations for processing a basic unit in a stacking method may include, at operation 410, determining whether SFC context label is present in a basic unit label stack associated with a packet, at operation 420, upon determination that SFC context label is present, performing a look-up operation based on the SFC context label, at operation 430, passing the packet to an SF instance, and at operation 440, decrementing a value of SF label.

Figure 5:
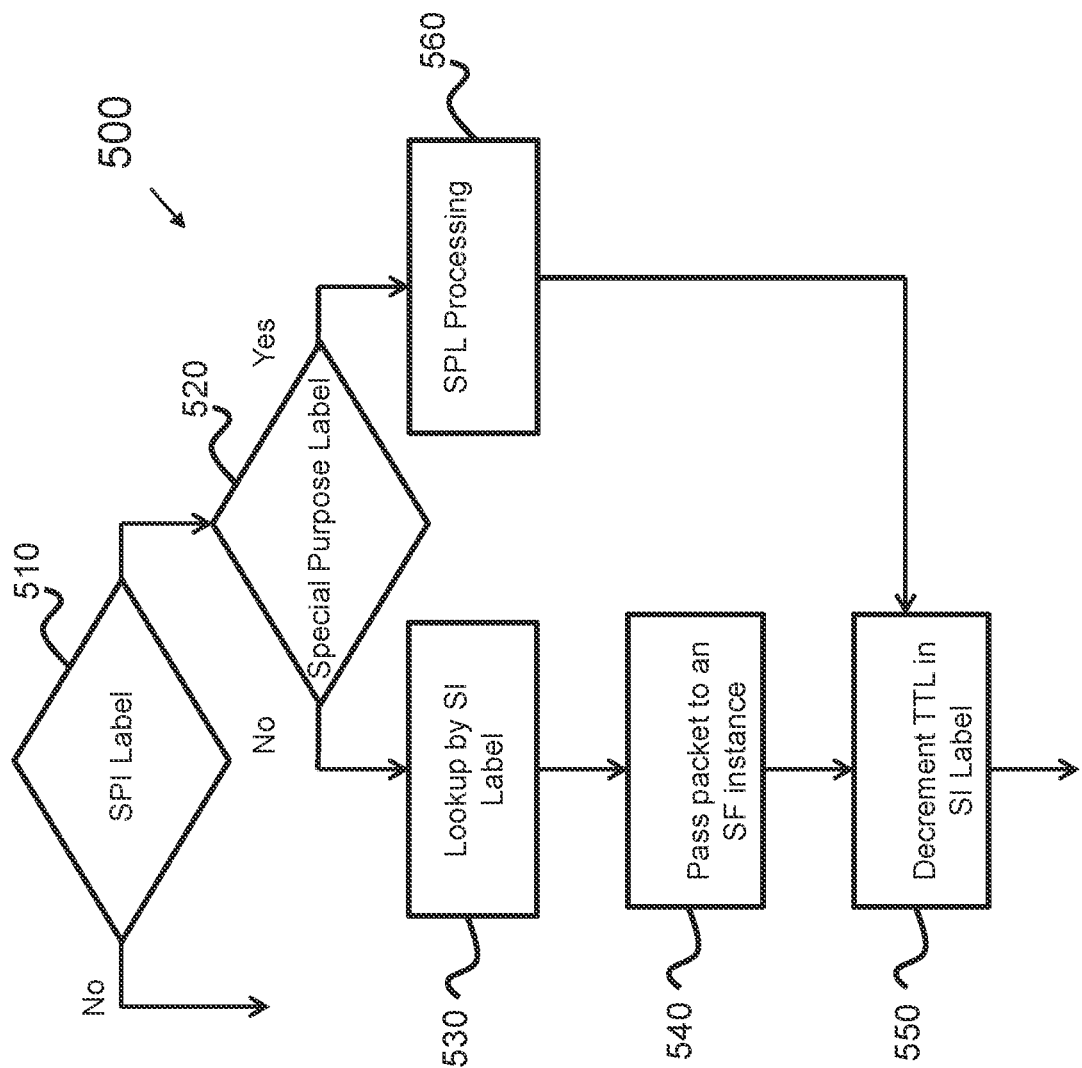
FIG. 5 shows an example flowchart of operations for processing a basic unit with a special purpose label (SPL) added.

FIG. 5 shows an example flowchart 500 of operations for processing a basic unit with a special purpose label (SPL) added.

The behavior for an instance of the basic unit that represents the particular SFP requires that upon matching the SFC context label value as shown in FIG. 3, a service function forwarder (SFF) passes the payload to a service function (SF) instance that is an interface to a particular network function (NF). If the payload is an OAM packet generated to monitor the SFP, however, it is possible that the NF will not recognize it and may drop it altogether, thereby creating a false negative defect detection state. The disclosed technology can be used in some implementations to avoid the false negative in the defect detection over an SFP using the MPLS forwarding plane (SFC-MPLS). In some implementations of the disclosed technology, a special purpose label (SPL) processing block can be used as shown in FIG. 5.

In some implementations, the operations for processing a basic unit with a special purpose label (SPL) includes, at operation 510, determining whether a service path identifier (SPI) label is present in a basic unit label stack associated with a packet, at operation 520, upon determination that SPI label is present, determining whether the SPL is present in the packet, at operation 530, upon determination that SPL is not present, performing a look-up operation based on an SI label, at operation 540, passing the packet to an SF instance, at operation 550, decrementing TTL value in an SI label, and at operation 560, upon determination that SPL is present in the packet, performing an SPL processing.

Figure 6:
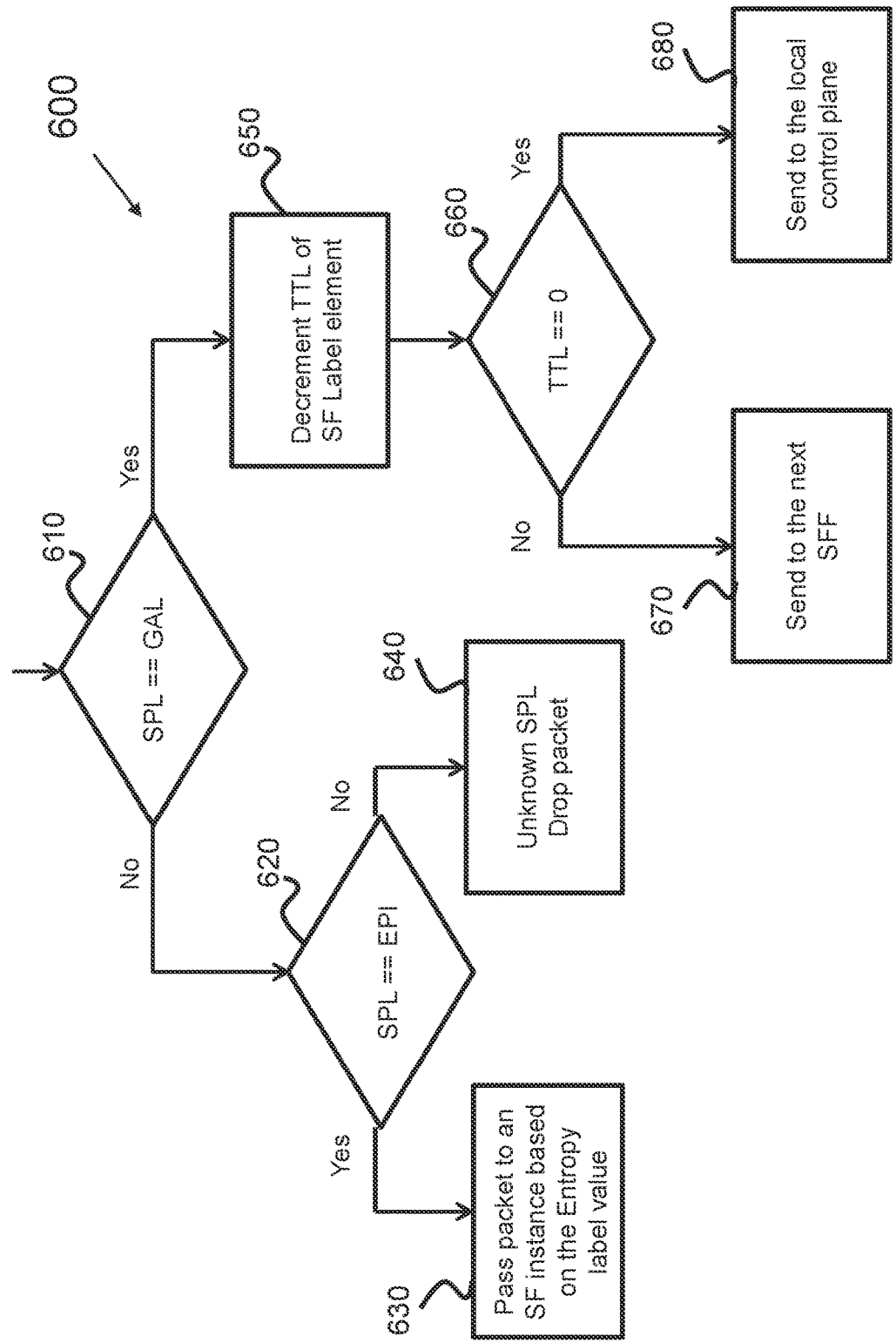
FIG. 6 shows an example flowchart of operations for processing an SPL block.

FIG. 6 shows an example flowchart of operations for processing an SPL block.

In some implementations, upon detection of GAL in the basic unit, the packet can be determined to be a test packet and can be passed to process the packet as a test packet. If the SPL within the basic unit label stack is GAL, then the payload is not passed to a service function instance (SFI) but processing continues by decrementing the TTL value of the SFL. In case the TTL value equals 0 after the decrement, the payload is passed to a control plane of the SFF to process a test packet associated with the GAL in the basic unit.

In some implementations, upon detection of inserting ELI and an entropy label in the basic unit, the packet can be processed to improve load balancing in MPLS networks. By inserting ELI and an entropy label in the basic unit stack, an operator can control load balancing among SFs of the same type connected to the same SFF. For example, a service function chain in FIG. 1 includes two SFFs that have more than one SF connected. In such a scenario, a controller that programs the label stack can select values of the entropy label to balance the load between SF A and SF A', and SF C and SF C'.

In some implementations, the operations for processing an SPL block includes, at operation 610, determining whether SPL in the basic unit stack corresponds to GAL, at operation 620, upon determination that the SPL does not correspond to GAL, determining whether the SPL corresponds to EPI, at operation 630, upon determination that the SPL corresponds to EPI, passing the packet to an SF instance based on the entropy label value, at operation 640, upon determination that the SPL does not correspond to EPI, dropping the packet as an unknown SPL.

At operation 650, upon determination that the SPL corresponds to GAL, decrementing the TTL value of an SF label element, at operation 660, determining whether the current TTL value is zero (0), at operation 670, upon determination that the TTL value is not identical to zero (0), sending the packet to the next SFF, and at operation 680, upon determination that the TTL value is identical to zero (0), sending the packer to a local control plane.

In some implementations of the disclosed technology, a basic unit can be used for optional special purposes or extended special purpose label can be inserted into the basic unit.

In some implementations of the disclosed technology, GAL can be inserted into the basic unit to control how an SFF handles the payload of the SFC-MPLS packet.

In some implementations of the disclosed technology, the SFF behavior can be modified to process the basic unit to determine the destination of the packer instead of passing the payload to an SF instance that is mapped to the SFF.

In some implementations of the disclosed technology, the combination of GAL and the SF label's TTL field can be used to trace SFFs of the given service function path (SFP).

In some implementations of the disclosed technology, the combination of ELI and the entropy label inserted into the basic unit can be used to balance the load among SFs of the same type mapped to the SFF.

Figure 7:
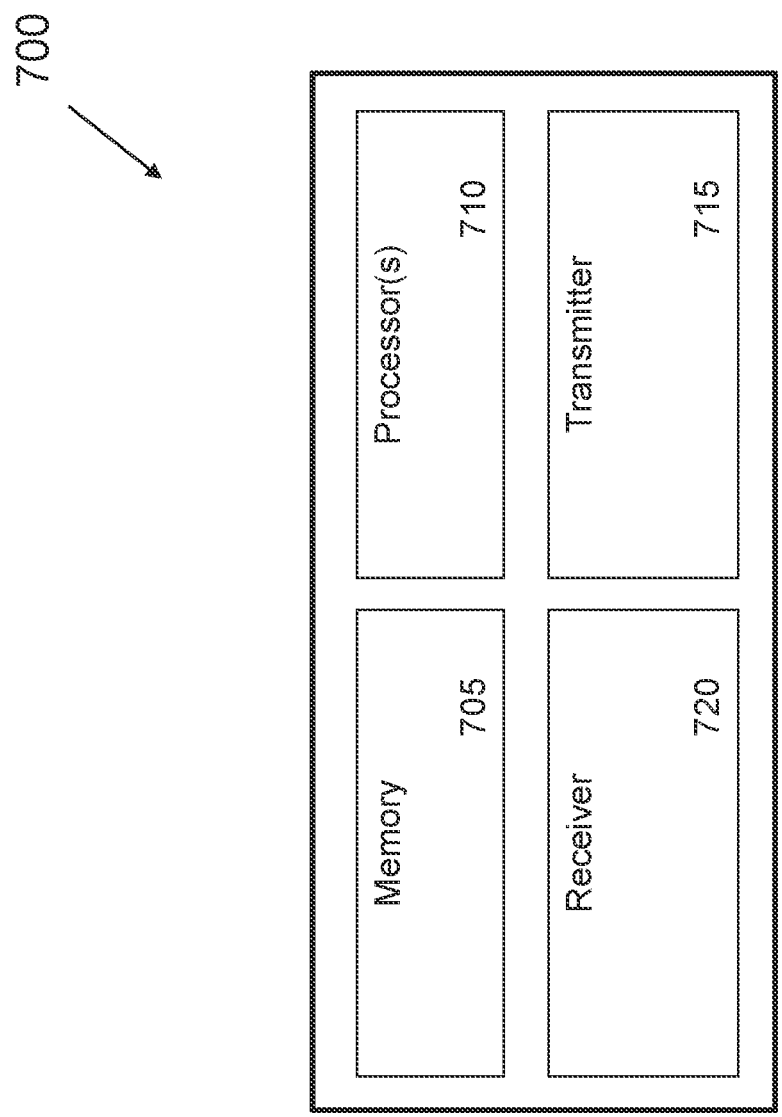
FIG. 7 shows an exemplary block diagram of a hardware platform that may be a part of a network device.

FIG. 7 shows an example block diagram of a hardware platform 700 that may be a part of a network device that performs the operation discussed in this patent document. The hardware platform 700 includes at least one processor 710 and a memory 705 that stores instructions associated with the operations discussed in this patent document. The instructions upon execution by the processor 710 configure the hardware platform 700 to perform the operations described in this patent document. The transmitter 715 transmits or sends information or data packets to another communication node or device. The receiver 720 receives information or data packets transmitted or sent by another communication node or device.

Figure 8:
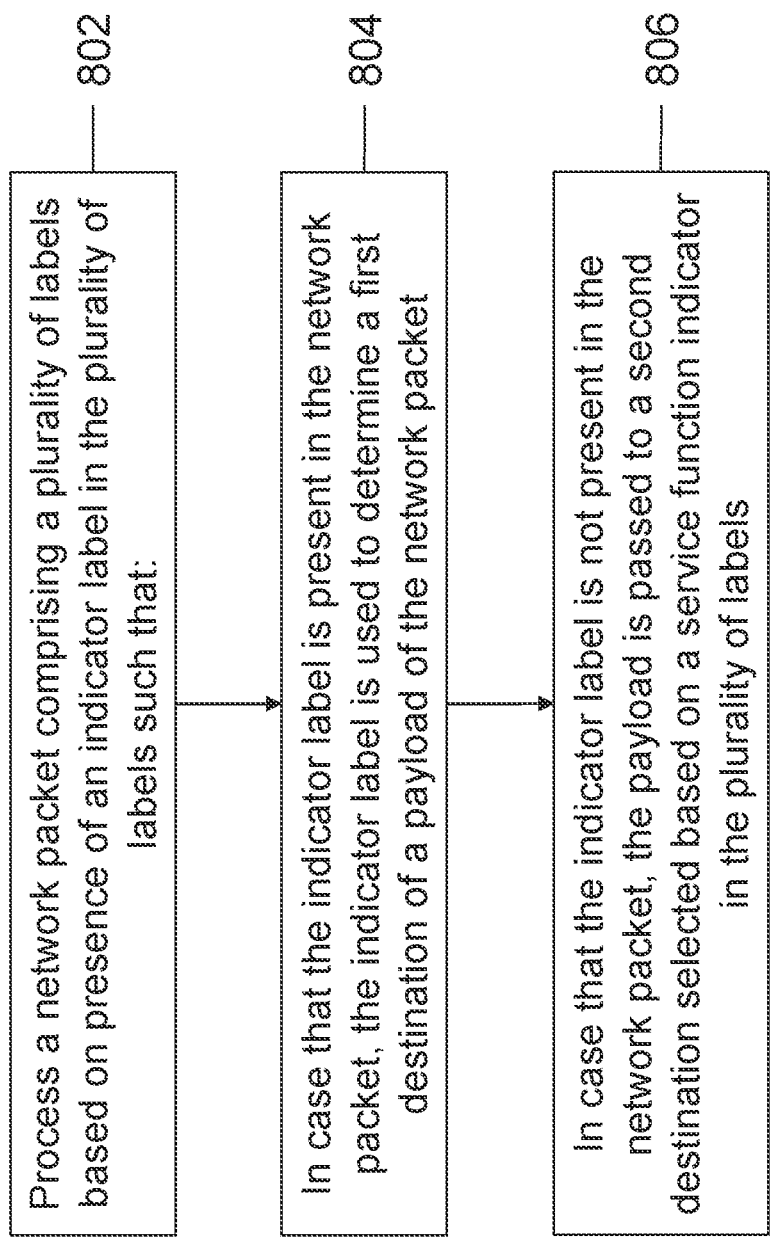
FIG. 8 shows an example of a packet processing method based on some example embodiments of the disclosed technology.

FIG. 8 shows an example of a packet processing method based on some example embodiments of the disclosed technology.

In some embodiments of the disclosed technology, a packet processing method includes processing a network packet comprising, at 802, a plurality of labels based on the presence of an indicator label in the plurality of labels such that, at 804, in case that the indicator label is present in the network packet, the indicator label is used to determine a first destination of a payload of the network packet, and at 806, in case that the indicator label is not present in the network packet, the payload is passed to a second destination selected based on a service function indicator in the plurality of labels.

In some implementations, the plurality of labels may include a service function chaining (SFC) context label, a service function (SF) label, a generic associated channel label (GAL), an entropy label indicator (ELI), and an entropy label (EL) as discussed above with reference to FIGS. 2A-2C. In an example, the generic associated channel label (GAL) can be an example of the indicator label where the first destination is a control plane associated with a generic associated channel (G-ACh) that can be used to carry control and management information, including OAM test packets. In another example, the entropy label indicator (ELI) and the entropy label (EL) can be examples of the indicator label where packets are processed to improve load balancing in MPLS networks. In some implementations, when the entropy label indicator (ELI) and the entropy label (EL) are the indicator label present in the network packet, an operator can control load balancing among service functions (SFs) of the same type connected to the same service function forwarder (SFF).

Figure 9:
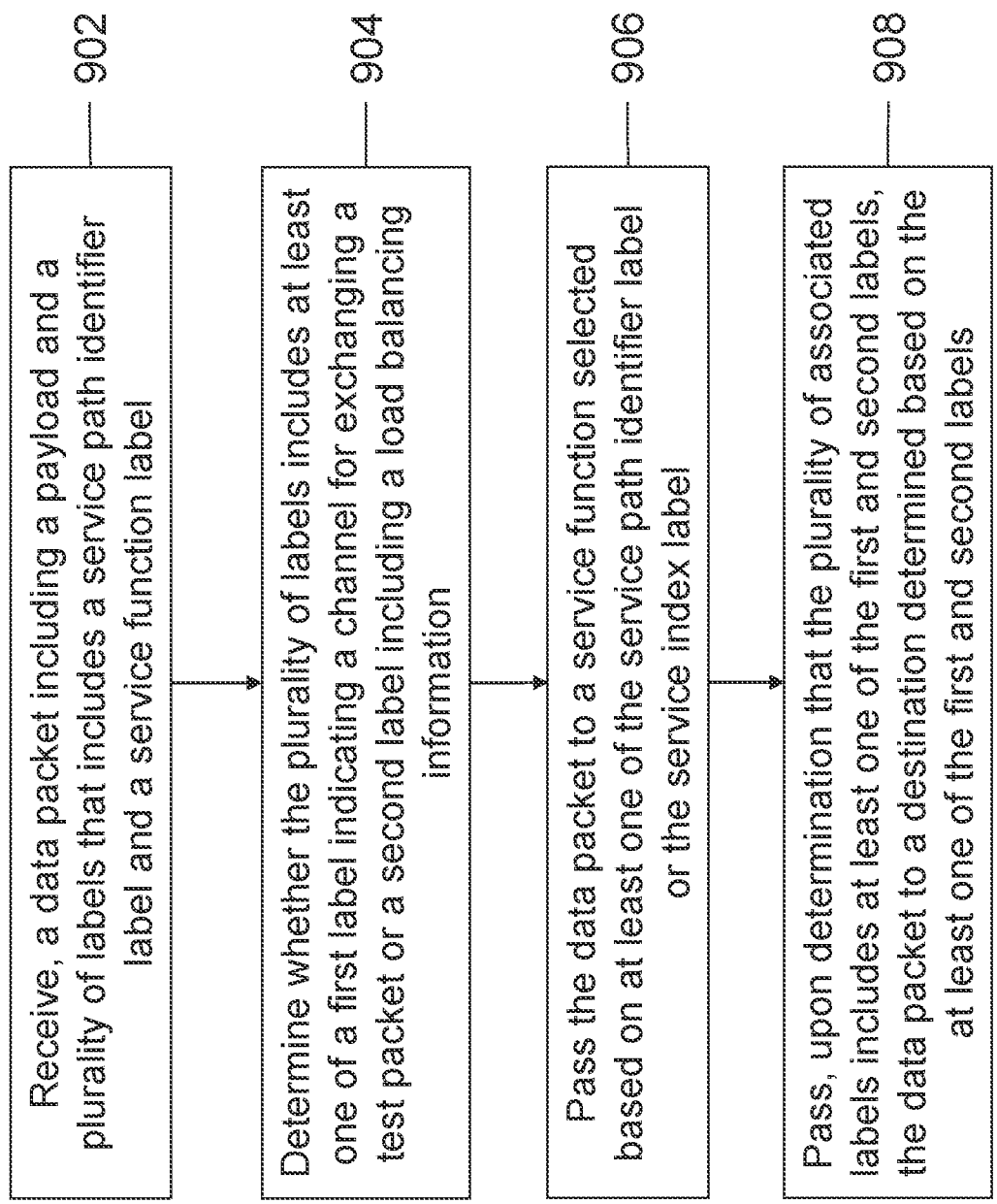
FIG. 9 shows an example of a data communication method based on some example embodiments of the disclosed technology.

FIG. 9 shows an example of a data communication method based on some example embodiments of the disclosed technology.

In some embodiments of the disclosed technology, a data communication method includes, at 902, receiving, a data packet including a payload and a plurality of labels that includes a service path identifier label and a service function label, at 904, determining whether the plurality of labels includes at least one of a first label indicating a channel for exchanging a test packet or a second label including a load balancing information, at 906, passing the data packet to a service function selected based on at least one of the service path identifier label or the service index label, and, at 908, passing, upon determination that the plurality of associated labels includes at least one of the first and second labels, the data packet to a destination determined based on the at least one of the first and second labels.

In some implementations, the service path identifier may be a field of a basic unit that is used to uniquely identify the service function path (SFP). In one example, an SFC context label field may contain the service path identifier. In some implementations, the service function label may be a field of the basic unit that contains a service index (SI) label.

In some implementations, the first label includes a generic associated channel label (GAL), and the second label includes an entropy label indicator (ELI) and an entropy label (EL) as discussed above with reference to FIGS. 2A-2C.

When the plurality of associated labels includes the first label such as the generic associated channel label (GAL), the data packet is determined to be an OAM test packet, and thus transmitted to a local control plane as illustrated in FIG. 6. In another example, the entropy label indicator (ELI) and the entropy label (EL) can be examples of the indicator label where packets are processed to improve load balancing in MPLS networks. When the plurality of associated labels includes the second label such as the entropy label indicator (ELI) and the entropy label (EL), the data packet is passed to one or more service function instances based on the entropy label value for load balancing purposes as illustrated in FIG. 6. In this way, an operator can control load balancing among service functions (SFs) of the same type connected to the same service function forwarder (SFF).

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Some embodiments may implement one or more of the following solutions, listed in clause-format. The following clauses are supported and further described in the Examples above and throughout this document.

Clause 1. A packet processing method, comprising: processing a network packet comprising a plurality of labels based on presence of an indicator label in the plurality of labels. The specific task performed in the processing may depend on whether or not an indicator label is present in the network pocket. For example, various embodiments of indicator labels are described with respect to FIGS. 2A-2C. The processing may be such that in case that the indicator label is present in the network packet, the indicator label is used to determine the first destination of a payload of the network packet, and in case that the indicator label is not present in the network packet, the payload is passed to a second destination selected based on a service function indicator in the plurality of labels.

Clause 2. The method of clause 1, wherein the network packet includes an operation, administration, and maintenance (OAM) network test packet generated to monitor a service function path. The OAM network test packet may be indicated by a special packet type.

Clause 3. The method of clause 1, wherein the second destination includes a service function selected based on the service function indicator in the plurality of labels. Several example embodiments of the service function are described with respect to FIG. 1.

Clause 4. The method of clause 3, wherein the service function indicator includes at least one of a service function (SF) label or a service function chaining (SFC) context label.

Clause 5. The method of clause 4, wherein the service function is selected based on a service index label in the service function (SF) label.

Clause 6. The method of clause 5, further comprising, upon passing the payload to the service function selected, decrementing a time-to-live value of a service index label in the service function (SF) label. As discussed above, the time-to-live value may be used as a time count and can be a basis for determining whether to send the packet to the next service function forwarder or the local control plane as discussed above with reference to FIG. 6.

Clause 7. The method of clause 4, wherein the service function is selected based on the service function chaining (SFC) context label.

Clause 8. The method of clause 7, further comprising, upon passing the payload to the service function selected, decrementing a value of the service function label. For example, after passing a packet to a service function instance, the value in the TTL field of the service function label stack entry is decremented.

Clause 9. The method of clause 1, wherein the plurality of labels is assigned to the payload and includes a service function (SF) label and a service function chaining (SFC) context label, wherein the indicator label, the service function (SF) label and the service function chaining (SFC) context label are stacked on top of each other, and wherein the indicator label is arranged between the service function label and the service function chaining context label.

Clause 10. The method of clause 2, wherein the indicator label includes a generic associated label (GAL) to indicate a generic associated channel over which the OAM test packet is exchanged. In some implementations, a control plane associated with a generic associated channel (G-ACh) can be used to carry control and management information, including OAM test packets. If the indicator label includes the GAL, the packet can be deemed an OAM test packet, and it can be exchanged over the generic associated channel (G-ACh).

Clause 11. The method of clause 10, wherein the first destination includes a service function forwarder different from a current service function forwarder.

Clause 12. The method of clause 10, wherein the first destination includes a control plane associated with a current service function forwarder.

Clause 13. The method of clause 1, wherein the indicator label includes an entropy label indicator (ELI) and an entropy label.

Clause 14. The method of clause 13, wherein the first destination includes a service function selected based on at least one of the entropy label indicator (ELI) and the entropy label.

Clause 15. A data communication method, comprising: receiving, a data packet including a payload and a plurality of labels that includes a service path identifier label and a service function label; determining whether the plurality of labels includes at least one of a first label indicating a channel for exchanging a test packet or a second label including a load balancing information; passing the data packet to a service function selected based on at least one of the service path identifier label or the service index label; and passing, upon determination that the plurality of associated labels includes at least one of the first and second labels, the data packet to a destination determined based on the at least one of the first and second labels.

Clause 16. The method of clause 15, wherein the data packet includes an operation, administration, and maintenance (OAM) test packet generated to monitor a service function path.

Clause 17. The method of clause 16, further comprising, upon determination that the plurality of associated labels includes the first label indicating a channel for exchanging a test packet, decrementing a time-to-live value of a service index label in the service function label.

Clause 18. The method of clause 17, wherein the first label includes a generic associated label (GAL) configured to indicate a generic associated channel over which the OAM test packet is exchanged.

Clause 19. The method of clause 18, further comprising: decrementing a time-to-live (TTL) value of the service index label; and passing, in case the TTL value reaches zero after decrementing the TTL value of the service index label, the OAM test packet to a control plane of the service function forwarder; or passing, in case the TTL value does not reach zero, the OAM test packet to a next service function forwarder.

Clause 20. The method of clause 15, wherein the second label includes an entropy label indicator (ELI) and an entropy label.

Clause 21. The method of clause 20, further comprising, upon determination that the plurality of associated labels includes the second label: selecting a service function as the destination based on a value of the entropy label; and passing the data packet to the selected service function.

Clause 22. The method of clause 21, wherein the selecting of the service function is based on a balance of load among a plurality of service functions of the same type mapped to a service function forwarder.

Clause 23. The method of clause 15, further comprising, upon determination that the plurality of associated labels does not include any of the first and second labels, dropping the data packet.

Clause 24. An apparatus for wireless communication, comprising a memory and a processor, wherein the processor reads code from the memory and implements a method recited in any of clauses 1 to 23.

Clause 25. A computer readable program storage medium having code stored thereon, the code, when executed by a processor, causing the processor to implement a method recited in any of clauses 1 to 23.

The embodiments discussed in this patent document can be used to implement various packet processing methods and data communication methods that enable service function forwarders in data communication networks implementing the service function chaining technology to recognize OAM test packets and other packets including special-purpose information to determine a destination or usage of the packet based on their special purpose. In this way, the packet processing methods and data communication methods implemented based on some embodiments of the disclosed technology can avoid potentially creating a false negative defect detection state that otherwise would have occurred had the packets been passed to a fixed destination regardless of the packet's special purpose.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A packet processing method, comprising:
processing a packet comprising a payload and a plurality of labels based on presence of an indicator label for indicating that the packet is a test packet, in the plurality of labels;
upon determination that the indicator label is present indicating that the packet is a test packet, continuing processing of the packet without passing the packet to a destination; and
upon determination that the indicator label is not present to indicate that the packet is not a test packet, passing the packet to the destination.

2. The method of claim 1, wherein the test packet includes an operation, administration, and maintenance (OAM) network test packet generated to monitor a service function path.

3. The method of claim 1, wherein the destination includes a service function selected based on a service function indicator in the plurality of labels.

4. The method of claim 3, wherein the service function indicator includes at least one of a service function (SF) label or a service function chaining (SFC) context label.

5. The method of claim 4, wherein the service function is selected based on a service index label in the service function (SF) label.

6. The method of claim 4, wherein the service function is selected based on the service function chaining (SFC) context label.

7. The method of claim 1, wherein the plurality of labels is assigned to the payload and includes a service function (SF) label and a service function chaining (SFC) context label, wherein the indicator label, the service function (SF) label and the service function chaining (SFC) context label are stacked on top of each other, and wherein the indicator label is arranged between the service function label and the service function chaining context label.

8. The method of claim 2, wherein the indicator label includes a generic associated label (GAL) to indicate a generic associated channel over which the OAM test packet is exchanged.

9. The method of claim 8, wherein the destination includes a service function forwarder different from a current service function forwarder.

10. The method of claim 8, wherein the destination includes a control plane associated with a current service function forwarder.

11. The method of claim 1, wherein the indicator label includes an entropy label indicator (ELI) and an entropy label.

12. The method of claim 11, wherein the packet is passed to a service function selected based on at least one of the entropy label indicator (ELI) and the entropy label.

13. A data communication method, comprising:
receiving a packet including a payload and a plurality of labels that includes a service path identifier label and a service function label;
determining whether the plurality of labels includes at least one of a first label indicating a channel for exchanging a test packet or a second label including a load balancing information;
upon determination that the first label is present indicating that the packet is a test packet, processing the packet without passing the packet to a destination; and
upon determination that the first label is not present to indicate that the packet is not a test packet, passing the packet to the destination.

14. The method of claim 13, wherein the data packet includes an operation, administration, and maintenance (OAM) test packet generated to monitor a service function path.

15. The method of claim 14, further comprising, upon passing the payload to the service function selected, decrementing a time-to-live value of a service index label in the service function label.

16. The method of claim 15, wherein the indicator label includes a generic associated label (GAL) configured to indicate a generic associated channel over which the OAM test packet is exchanged.

17. The method of claim 13, wherein the second label includes an entropy label indicator (ELI) and an entropy label.

18. The method of claim 17, further comprising, upon determination that the plurality of labels includes the second label:
selecting a service function as the destination based on a value of the entropy label; and
passing the data packet to the selected service function.

19. The method of claim 18, wherein the selecting of the service function is based on a balance of load among a plurality of service functions of a same type mapped to a service function forwarder.

20. The method of claim 13, further comprising, upon determination that the plurality of labels does not include any of the first and second labels, dropping the data packet.

* * * * *